(12) United States Patent
Blank, Jr. et al.

(10) Patent No.: US 8,825,664 B2
(45) Date of Patent: *Sep. 2, 2014

(54) INDEXING PREVIEW

(75) Inventors: Mitchell Neuman Blank, Jr., San Francisco, CA (US); Leonid Budchenko, San Jose, CA (US); David Carasso, San Rafael, CA (US); Micah James Delfino, San Francisco, CA (US); Johnvey Hwang, San Francisco, CA (US); Stephen Phillip Sorkin, San Francisco, CA (US); Eric Timothy Woo, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 134 days.

This patent is subject to a terminal disclaimer.

(21) Appl. No.: 13/588,939

(22) Filed: Aug. 17, 2012

(65) Prior Publication Data

US 2014/0052733 A1 Feb. 20, 2014

(51) Int. Cl.
  *G06F 7/00* (2006.01)
  *G06F 17/30* (2006.01)
(52) U.S. Cl.
  USPC .......................................................... 707/741
(58) Field of Classification Search
  USPC .......................................... 707/741, 999.002
  See application file for complete search history.

(56) References Cited

U.S. PATENT DOCUMENTS

| 7,272,589 | B1 * | 9/2007 | Guay et al. ..................... 707/716 |
| 7,743,060 | B2 * | 6/2010 | Fontoura et al. .............. 707/737 |
| 8,380,752 | B2 * | 2/2013 | Botros et al. .................. 707/802 |
| 2005/0060340 | A1 * | 3/2005 | Sommerfield et al. ........ 707/102 |
| 2010/0250566 | A1 * | 9/2010 | Paul ............................... 707/756 |
| 2011/0173180 | A1 * | 7/2011 | Gurumurthy et al. ........ 707/711 |
| 2012/0265726 | A1 * | 10/2012 | Padmanabhan et al. ...... 707/602 |

OTHER PUBLICATIONS

Carasso, D., "Exploring Splunk: Search Processing Language (SPL) Primer and Cookbook," Splunk, Apr. 2012.
Official Communication for U.S. Appl. No. 13/662,337 mailed Jan. 8, 2013.
Notice of Allowance of Apr. 29, 2013 for U.S. Appl. No. 13/662,337, 9 pages.

\* cited by examiner

*Primary Examiner* — Aleksandr Kerzhner
(74) *Attorney, Agent, or Firm* — Hickman Palermo Truong Becker Bingham Wong LLP; Kirk D. Wong

(57) ABSTRACT

Embodiments are directed towards previewing results generated from indexing data raw data before the corresponding index data is added to an index store. Raw data may be received from a preview data source. After an initial set of configuration information may be established, the preview data may be submitted to an index processing pipeline. A previewing application may generate preview results based on the preview index data and the configuration information. The preview results may enable previewing how the data is being processed by the indexing application. If the preview results are not acceptable, the configuration information may be modified. The preview application enables modification of the configuration information until the generated preview results may be acceptable. If the configuration information is acceptable, the preview data may be processed and indexed in one or more index stores.

30 Claims, 9 Drawing Sheets

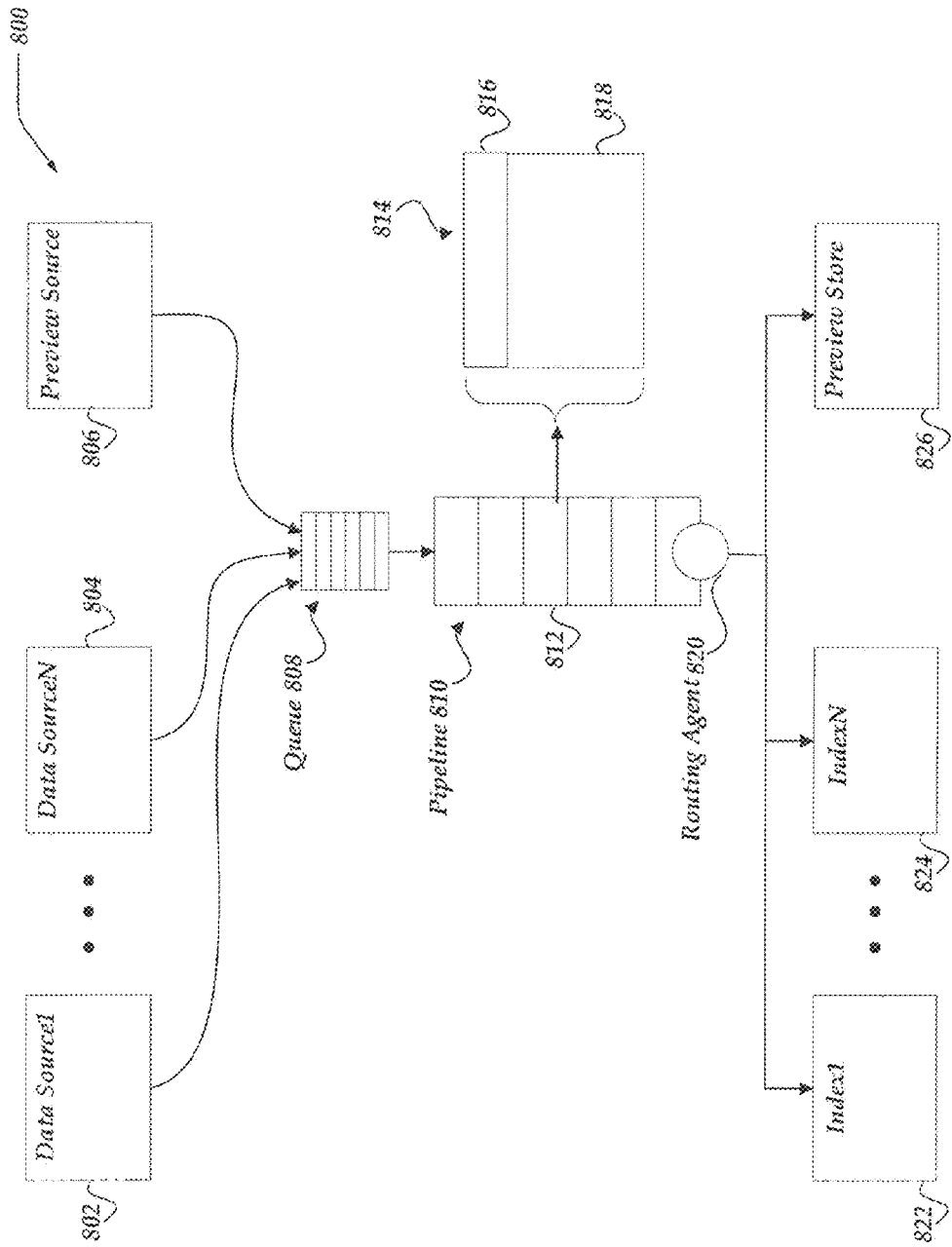

INDEXING PREVIEW

TECHNICAL FIELD

This invention relates generally to information organization, search, and retrieval and more particularly, previewing search results before received search engine data is indexed.

BACKGROUND

The rapid increase in the production and collection of machine-generated data has created large data sets that are difficult to search. The machine data can include sequences of time stamped records that may occur in one or more usually continuous streams. Further, machine data often represents activity made up of discrete events.

Often, search engines may receive raw data from various data sources, including machine data. In some cases, search engines may be configured to transform raw data in various ways prior to storing it as indexed data. Sometimes the search engine configuration information used to process the received raw data may include improper and/or ineffective rules that may generate ineffective index data. If such improper index data may be added to an index store it may pollute the index reducing the quality of search results that may be produced.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Description Of The Various Embodiments, which is to be read in association with the accompanying drawings, wherein:

FIG. 8 illustrates a logical architecture of a system for indexing previewing in accordance with at least one of the various embodiments.

DETAILED DESCRIPTION OF THE DRAWINGS

Figure 1:
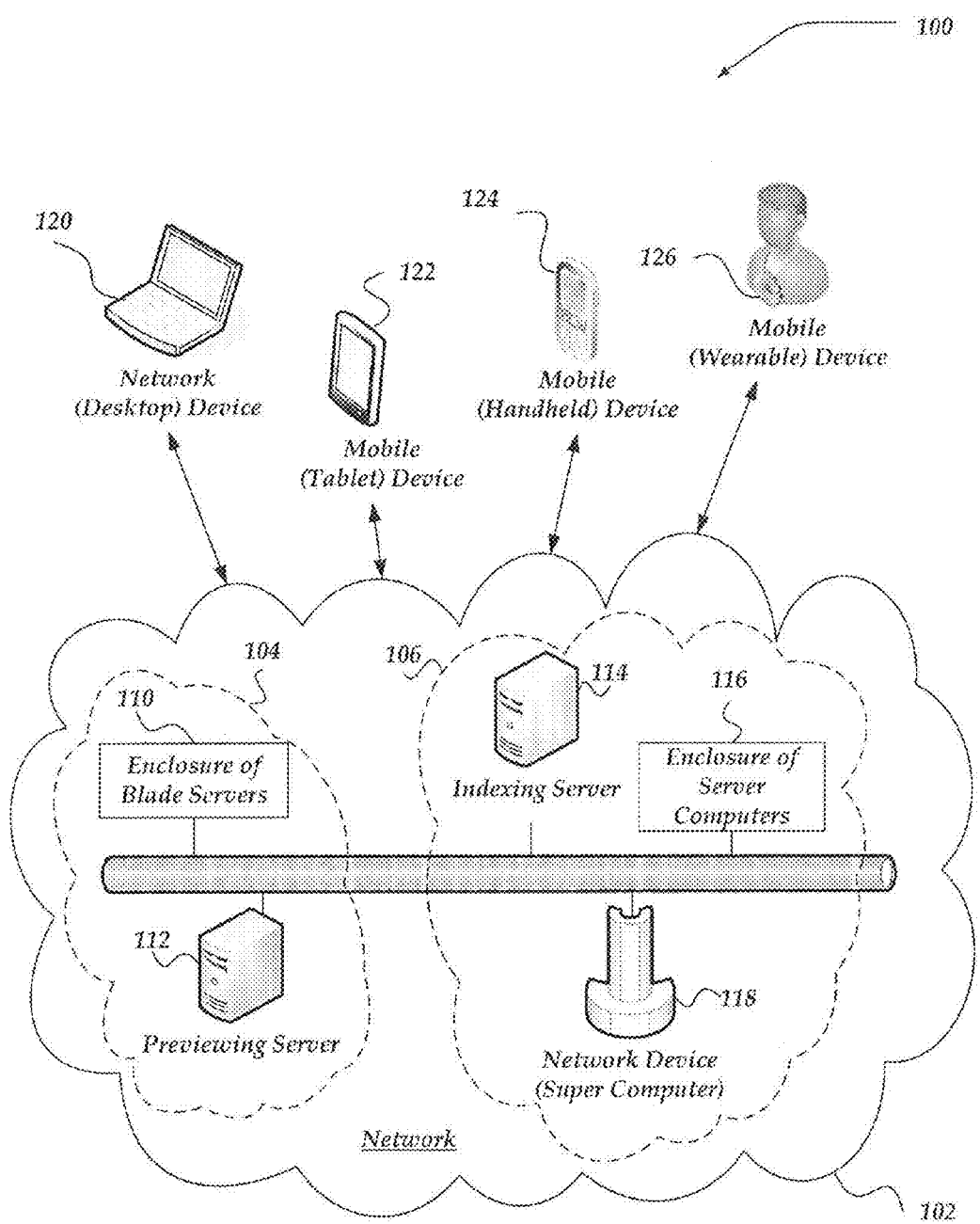
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

The term "machine data" as used herein may include server logs and other types of machine data (i.e., data generated by machines). In at least one of the various embodiments, machine data streams may be time stamped to create time stamped events. For example, information processing environments, such as, firewalls, routers, web servers, application servers and databases may generate streams of time series data in the form of events. In some cases, events may be generated hundreds or thousands of times per second.

The term "time series data" as used herein is data where each data record has a timestamp associated with it. A "Time Series Search Engine" is a search engine which, in at least one of the various embodiments, can perform queries limited by a time range (such as between one time and another, or data earlier than a given time, or the like) on the stored data and/or generate results ordered by time and/or timestamps (such as from earliest-to-latest or vice versa).

The term "data repository" as used herein refers to data sources that may contain unstructured or structured data, such as databases, file systems, search engine indexes, or the like. In at least one of the various embodiments, a data repository may be a live stream of data. In other cases, a data repository may be static data, or a combination of live data or static data. In at least one of the various embodiments, data repositories may provide interfaces such as, application programming interfaces (API) for receiving requests, queries regarding the data stored in the data repository.

The term "configuration information" as used herein refers to data and/or directives that may be employed by an indexer application or a previewing application for processing, such as indexing, transforming, and/or interpreting raw data received from data sources. The configuration information may be saved using various storage mechanisms, such as, file systems, databases, computer memory, or the like.

Configuration information may include rules that may be comprised of filters, matching functions, rules for determining "event boundaries" within raw data and/or preview data (e.g., rules for dividing an event stream into individual lines, rules for merging lines into multi-line events, or the like), rules for locating and parsing timestamps in raw data and/or preview data, or the like. The configuration information may be employed by the indexer application to identify events of interest that may be included in machine-generated data, identify and extract fields within events, or the like.

The term "raw data" as used herein refers to non-indexed data before it is processed by an indexer application or a previewing application. In at least one of the various embodiments, the raw data may be machine-generated data. Indexer applications and previewing applications may use the configuration information to determine how to interpret the raw data.

The term "preview data" as used herein refers to a portion of the raw data that is received from a preview data source and designated for additional processing. After the preview data is indexed by the indexer application, the preview index data is stored in a separate preview store rather than being automatically stored in an index store. Once the configuration information for the preview index data is approved, subsequent raw data received from the preview data source is automatically indexed and stored in the index store.

The term "index data" as used herein refers to raw data and/or preview data that has been indexed and processed into a format suitable for adding to an index store by an indexer application, indexer applications may generate index data from raw data received from data sources and/or preview data sources.

The term "worker agent" as used herein refers to processes that perform actions on the raw data and/or preview data to transform it into index data and/or preview index data. Worker agents may employ configuration information to determine how to process the raw data and/or preview data.

The term "queue" as used herein refers to system components that receive chunks of raw data and/or preview data from various data sources and/or preview data sources. Queues may act as staging areas before the raw data and/or preview data are further processed. Raw data and/or preview data may be removed from a queue and transferred to one or more pipelines for further processing.

The term "pipeline" as used herein refers to system components that may be associated with one or more processors, such as, worker agents. In some embodiments, the first processor in a pipeline may be responsible for retrieving raw data chunks and/or preview data chunks from a queue and sending them to other processors. Other processors may perform operations on the raw data chunks and/or preview data chunks, such as, breaking the data into lines or extracting fields based on configuration information. In at least one of the various embodiments, the last processor for a pipeline may transfer data chunks to another queue for consumption by a different pipeline for additional processing. As data chunks advance through the pipeline, processors (e.g., worker agents) may process the raw data chunks and/or preview data chunks into index data and/or preview index data.

The term "query string" as used herein refers to commands and/or sequences of commands that are used for querying, searching and/or retrieving data from a data repository. Queries generally produce a result or results based on the form and structure of the particular query string. Query results may be sorted and grouped based on the structure and form of the query string. In at least one of the various embodiments, query strings may include commands, operators, functions, or the like for calculating values based on the stored records, including functions that produce result sets that may include statistics and metrics about the data stored in data repository. Structured Query Language (SQL) is a well-known query language often used to form queries for relational databases. However, the various embodiments are not limited to using SQL-like formatting for query strings. Accordingly, other well known query languages and/or custom query languages may be employed consistent with what is claimed herein.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards previewing the results generated from indexing raw data from selected preview data sources before the corresponding index data is added to an index store. In at least one of the various embodiments, raw data may be received from a preview data source, and/or data source. In at least one of the various embodiments, after an initial set of configuration information is established, the preview data may be submitted to a pipeline that may perform index processing on the preview data and other raw data. The preview index data is stored in a preview data store that is separate from the index data store that stores the indexed data.

In at least one of the various embodiments, a previewing application may generate preview results based on the preview index data and the configuration information. In at least one of the various embodiments, the preview results enable a user to view how the preview data is being processed by the indexing application. In at least one of the various embodiments, if the preview results may not be acceptable, the configuration information employed to generate the preview index data may be modified.

In at least one of the various embodiments, the preview application may enable iterative modification of the configuration information used for processing the preview data until the generated preview results may be acceptable. In at least one of the various embodiments, once the configuration information for the preview index data is approved, subsequent raw data received from the preview data source is automatically indexed and stored in the index store.

Illustrative Operating Environment

FIG. 1 shows components of an environment in which various embodiments may be practiced. Not all of the components may be required to practice the various embodiments, and variations in the arrangement and type of the components may be made without departing from the spirit or scope of the various embodiments.

In at least one embodiment, cloud network 102 enables one or more network services for a user based on the operation of corresponding arrangements 104 and 106 of virtually any type of networked computing device. As shown, the networked computing devices may include previewing server device 112, indexing server device 114, enclosure of blade servers 110, enclosure of server computers 116, super computer network device 118, and the like. Although not shown, one or more mobile devices may be included in cloud network 102 in one or more arrangements to provide one or more network services to a user. Also, these arrangements of networked computing devices may or may not be mutually exclusive of each other.

Additionally, the user may employ a plurality of virtually any type of wired or wireless networked computing devices to communicate with cloud network 102 and access at least one of the network services enabled by one or more of arrangements 104 and 106. These networked computing devices may include tablet mobile device 122, handheld mobile device 124, wearable mobile device 126, desktop network device 120, and the like. Although not shown, in various embodiments, the user may also employ notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), televisions, integrated devices combining at least one of the preceding devices, and the like.

One embodiment of a mobile device is described in more detail below in conjunction with FIG. 3. Generally, mobile devices may include virtually any substantially portable networked computing device capable of communicating over a wired, wireless, or some combination of wired and wireless network.

In various embodiments, network 102 may employ virtually any form of communication technology and topology. For example, network 102 can include local area networks Personal Area Networks (PANs), (LANs), Campus Area Networks (CANs), Metropolitan Area Networks (MANs) Wide Area Networks (WANs), direct communication connections, and the like, or any combination thereof. On an interconnected set of LANs, including those based on differing architectures and, protocols, a router acts as a link between LANs, enabling messages to be sent from one to another. In addition, communication links within networks may include virtually any type of link, e.g., twisted wire pair lines, optical fibers, open air lasers or coaxial cable, plain old telephone service (POTS), wave guides, acoustic, full or fractional dedicated digital communication lines including T1, T2, T3, and T4, and/or other carrier and other wired media and wireless media. These carrier mechanisms may include E-carriers, Integrated Services Digital Networks (ISDNs), universal serial bus (USB) ports, Firewire ports, Thunderbolt ports, Digital Subscriber Lines (DSLs), wireless links including satellite links, or other communications links known to those skilled in the art. Moreover, these communication links may further employ any of a variety of digital signaling technologies, including without limit, for example, DS-0, DS-1, DS-2, DS-3, DS-4, OC-3, OC-12, OC-48, or the like. Furthermore, remotely located computing devices could be remotely connected to networks via a modem and a temporary communication link. In essence, network 102 may include virtually any communication technology by which information may travel between computing devices. Additionally, in the various embodiments, the communicated information may include virtually any kind of information including, but not limited to processor-readable instructions, data structures, program modules, applications, raw data, control data, archived data, video data, voice data, image data, text data, and the like.

Network 102 may be partially or entirely embodied by one or more wireless networks. A wireless network may include any of a variety of wireless sub-networks that may further overlay stand-alone ad-hoc networks, and the like. Such sub-networks may include mesh networks, Wireless LAN (WLAN) networks, Wireless Router (WR) mesh, cellular networks, pico networks, PANs, Open Air Laser networks, Microwave networks, and the like. Network 102 may further include an autonomous system of intermediate network devices such as terminals, gateways, routers, switches, firewalls, load balancers, and the like, which are coupled to wired and/or wireless communication links. These autonomous devices may be operable to move freely and randomly and organize themselves arbitrarily, such that the topology of network 102 may change rapidly.

Network 102 may further employ a plurality of wired and wireless access technologies, e.g., 2nd (2G), 3rd (3G), 4th (4G), $5^{th}$ (5G) generation wireless access technologies, and the like, for mobile devices. These wired and wireless access technologies may also include Global System for Mobile communication (GSM), General Packet Radio Services (GPRS), Enhanced Data GSM Environment (EDGE), Code Division Multiple Access (CDMA), Wideband Code Division Multiple Access (WCDMA), Long Term Evolution Advanced (LTE), Universal Mobile Telecommunications System (UMTS), Orthogonal frequency-division multiplexing (OFDM), Wideband Code Division Multiple Access (W-CDMA), Code Division Multiple Access 2000 (CDMA2000), Evolution-Data Optimized (EV-DO), High-Speed Downlink Packet Access (HSDPA), IEEE 802.16 Worldwide interoperability for Microwave Access (WiMax), ultra wide band (UWB), user datagram protocol (UDP), transmission control protocol/internet protocol (TCP/IP), any portion of the Open Systems Interconnection (OSI) model protocols, Short Message Service (SMS), Multimedia Messaging Service (MMS), Web Access Protocol (WAP), Session Initiation Protocol/Real-time Transport Protocol (SIP/RTP), or any of a variety of other wireless or wired communication protocols. In one non-limiting example, network 102 may enable a mobile device to wirelessly access a network service through a combination of several radio network access technologies such as GSM, EDGE, SMS, HSDPA, LTE and the like.

Enclosure of Blade Servers

Figure 2A:
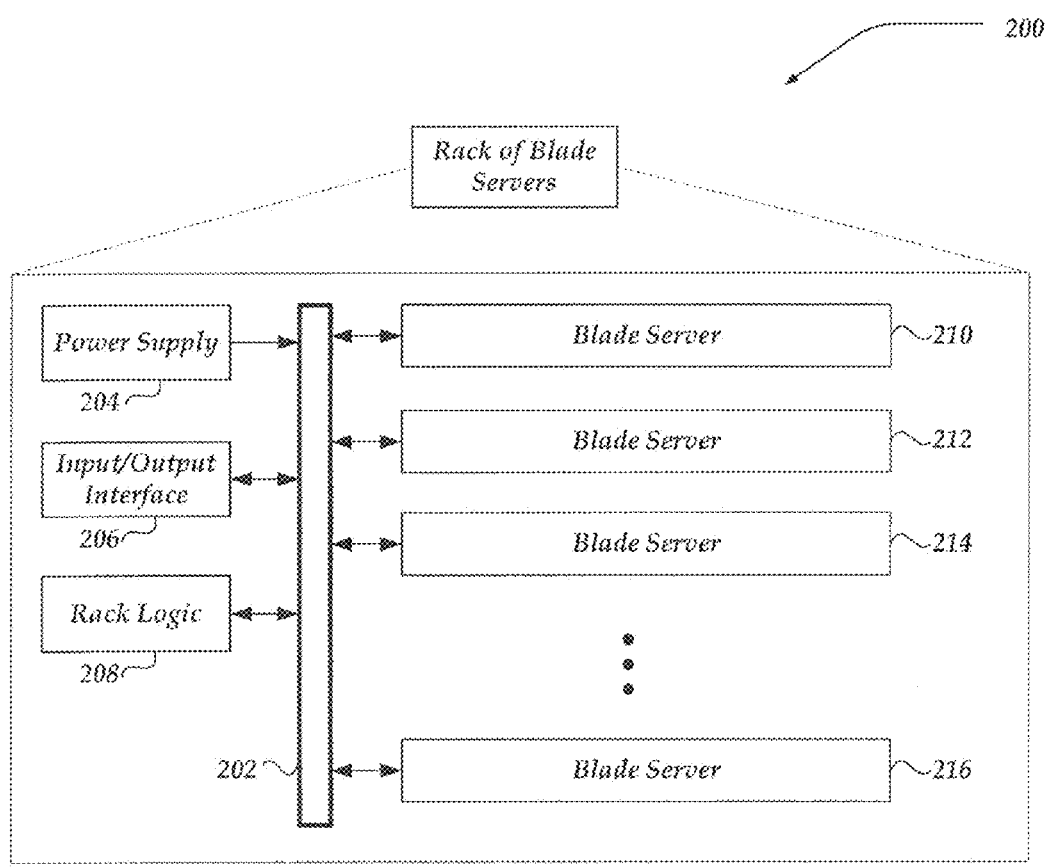
FIG. 2A shows a schematic drawing of a rack of blade servers.

FIG. 2A shows one embodiment of an enclosure of blade servers 200, which are also illustrated in FIG. 1. Enclosure of blade servers 200 may include many more or fewer components than those shown in FIG. 2A. However, the components shown are sufficient to disclose an illustrative embodiment. Generally, a blade server is a stripped down server computing device with a modular design optimized to minimize the use of physical space and energy. A blade enclosure can include several blade servers and provide each with power, cooling, network interfaces, input/output interfaces, and resource management. Although not shown, an enclosure of server computers typically includes several computers that merely require a network connection and a power cord connection to operate. Each server computer often includes redundant components for power and interfaces.

As shown in the figure, enclosure 200 contains power supply 204, and input/output interface 206, rack logic 208, several blade servers 210, 212, 214, and 216, and backplane 202. Power supply 204 provides power to each component and blade server within the enclosure. The input/output interface 206 provides internal and external communication for components and blade servers within the enclosure. Backplane 208 can enable passive and active communication of power, logic, input signals, and output signals for each blade server.

Illustrative Blade Server

Figure 2B:
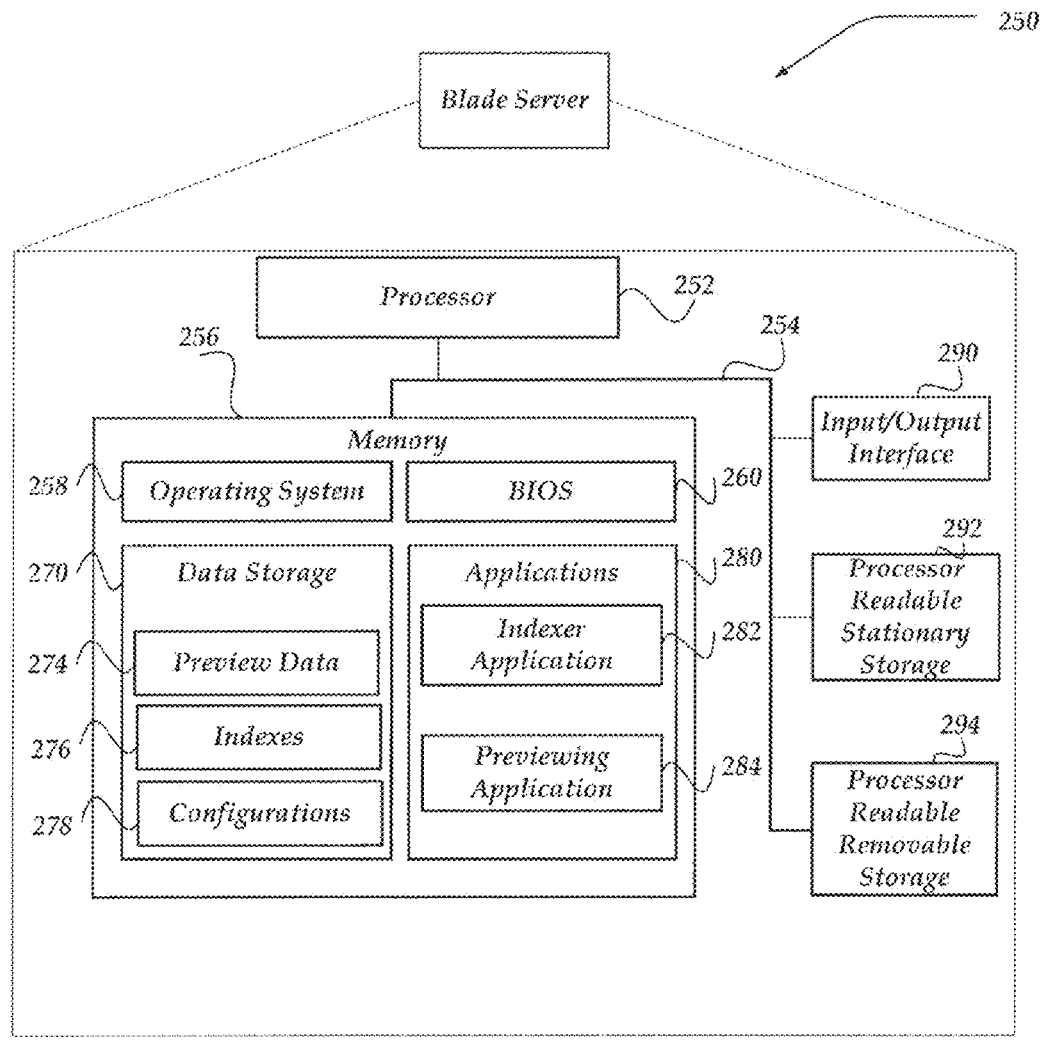
FIG. 2B illustrates a schematic embodiment of a blade server that may be included in a rack of blade servers such as that shown in FIG. 2A.

FIG. 2B illustrates an illustrative embodiment of blade server 250, which may include many more or fewer components than those shown. As shown in FIG. 2A, a plurality of blade servers may be included in one enclosure that shares resources provided by the enclosure to reduce size, power, and cost.

Blade server 250 includes processor 252 which communicates with memory 256 via bus 254. Blade server 250 also includes input/output interface 290, processor-readable stationary storage device 292, and processor-readable removable storage device 294. Input/output interface 290 can enable blade server 250 to communicate with other blade servers, mobile devices, network devices, and the like. Interface 290 may provide wireless and/or wired communication links for blade server. Processor-readable stationary storage device 292 may include one or more devices such as an electromagnetic storage device (hard disk), solid state hard disk (SSD), hybrid of both an SSD and a hard disk, and the like. In some configurations, a blade server may include multiple storage devices. Also, processor-readable removable storage device 294 enables processor 252 to read non-transitive storage media for storing and accessing processor-readable instructions, modules, data structures, and other forms of data. The non-transitive storage media may include Flash drives, tape media, floppy media, and the like.

Memory 256 may include Random Access Memory (RAM), Read-Only Memory (ROM), hybrid of RAM and ROM, and the like. As shown, memory 256 includes operating system 258 and basic input/output system (BIOS) 260 for enabling the operation of blade server 250. In various embodiments, a general-purpose operating system may be employed such as a version of UNIX, LINUX™, a specialized server operating system such as Microsoft's Windows Server™ and Apple Computer's IoS Server™, or the like.

Memory 256 further includes one or more data storage 270, which can be utilized by blade server 250 to store, among other things, applications 280 and/or other data. Data stores 270 may include program code, data, algorithms, and the like, for use by processor 252 to execute and perform actions. In one embodiment, at least some of data store 270 might also be stored on another component of blade server 250, including, but not limited to, processor-readable removable storage device 294, processor-readable stationary storage device 292, or any other processor-readable storage device (not shown). Data storage 270 may include, for example, preview data 274, indexes 276, or configurations 278.

Applications 280 may include processor executable instructions which, when executed by blade server 250, transmit, receive, and/or otherwise process messages, audio, video, and enable communication with other networked computing devices. Examples of application programs include database servers, file servers, calendars, transcoders, and so forth. Applications 280 may include, for example, indexer application 282, and previewing application 284.

Human interface components (not pictured), may be remotely associated with blade server 250, which can enable remote input to and/or output from blade server 250. For example, information to a display or from a keyboard can be routed through the input/output interface 290 to appropriate peripheral human interface components that are remotely located. Examples of peripheral human interface components include, but are not limited to, an audio interface, a display, keypad, pointing device, touch interface, and the like.

Illustrative Mobile Device

Figure 3:
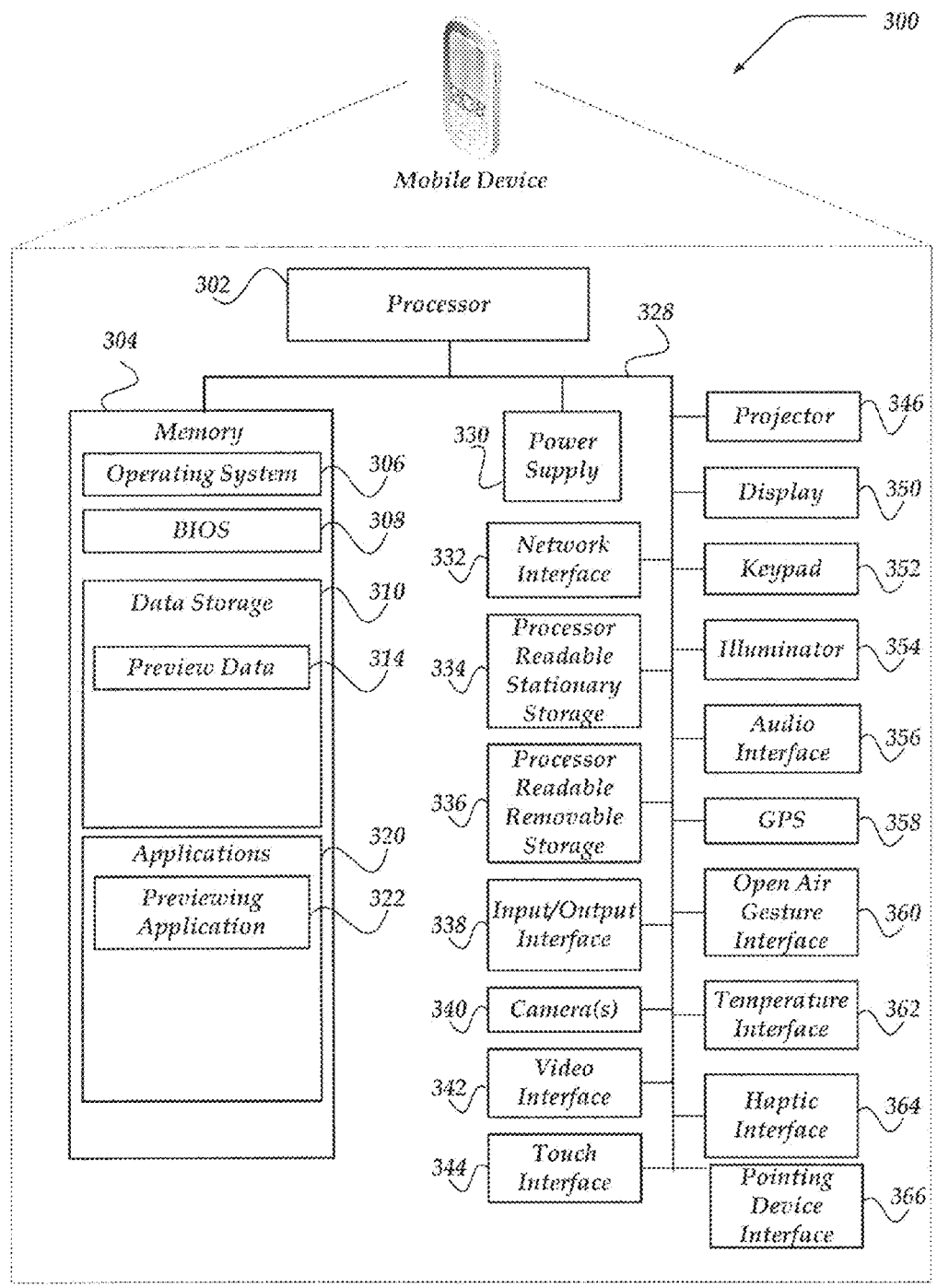
FIG. 3 shows a schematic embodiment of a mobile device.

FIG. 3 shows one embodiment of mobile device 300 that may include many more or less components than those shown. Mobile device 300 may represent, for example, at least one embodiment of mobile devices shown in FIG. 1.

Mobile device 300 includes processor 302 in communication with memory 304 via bus 328. Mobile device 300 also includes power supply 330, network interface 332, audio interface 356, display 350, keypad 352, illuminator 354, video interface 342, input/output interface 338, haptic interface 364, global positioning systems (GPS) receiver 358, Open air gesture interface 360, temperature interface 362, camera(s) 340, projector 346, pointing device interface 366, processor-readable stationary storage device 334, and processor-readable removable storage device 336. Power supply 330 provides power to mobile device 300. A rechargeable or non-rechargeable battery may be used to provide power. The power may also be provided by an external power source, such as an AC adapter or a powered docking cradle that supplements and/or recharges the battery. And in one embodiment, although not shown, a gyroscope may be employed within mobile device 300 to measuring and/or maintaining an orientation of mobile device 300.

Mobile device 300 may optionally communicate with a base station (not shown), or directly with another computing device. Network interface 332 includes circuitry for coupling mobile device 300 to one or more networks, and is constructed for use with one or more communication protocols and technologies including, but not limited to, protocols and technologies that implement any portion of the Open Systems Interconnection (OSI) model for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), Web Access Protocol (WAP), ultra wide band (UWB), IEEE 802.16 Worldwide Interoperability for Microwave Access (WiMax), Session Initiation Protocol/Real-time Transport Protocol (SIP/RTP), General Packet Radio Services (GPRS) Enhanced Data GSM Environment (EDGE), Wideband Code Division Multiple Access (WCDMA), Long Term Evolution Advanced (LTE), Universal Mobile Telecommunications System (UMTS), Orthogonal frequency-division multiplexing (OFDM), Code Division Multiple Access 2000 (CDMA2000), Evolution-Data Optimized (EV-DO), High-Speed Downlink Packet Access (HSDPA), or any of a variety of other wireless communication protocols. Network interface 332 is sometimes known as a transceiver, transceiving device, or network interface card (NIC).

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of mobile device 300, e.g., using voice recognition, detecting touch based on sound, and the like.

Display 350 may be a liquid crystal display (LCD), gas plasma, electronic ink, light emitting diode (LED), Organic LED (OLED) or any other type of light reflective or light transmissive display that can be used with a computing device. Display 350 may also include a touch interface 344 arranged to receive input from an object such as a stylus or a digit from a human hand, and may use resistive, capacitive, surface acoustic wave (SAW), infrared, radar, or other technologies to sense touch and/or gestures. Projector 346 may be a remote handheld projector or an integrated projector that is capable of projecting an image on a remote wall or any other reflective object such as a remote screen.

Video interface 342 may be arranged to capture video images, such as a still photo, a video segment, an infrared video, or the like. For example, video interface 342 may be coupled to a digital video camera, a web-camera, or the like. Video interface 342 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 352 may comprise any input device arranged to receive input from a user. For example, keypad 352 may include a push button numeric dial, or a keyboard. Keypad 352 may also include command buttons that are associated with selecting and sending images. Illuminator 354 may provide a status indication and/or provide light. Illuminator 354 may remain active for specific periods of time or in response to events. For example, when illuminator 354 is active, it may backlight the buttons on keypad 352 and stay on while the mobile device is powered. Also, illuminator 354 may backlight these buttons in various patterns when particular actions are performed, such as dialing another mobile device. Illuminator 354 may also cause light sources positioned within a transparent or translucent case of the mobile device to illuminate in response to actions.

Mobile device 300 also comprises input/output interface 338 for communicating with external peripheral devices or other computing devices such as other mobile devices and network devices. The peripheral devices may include an audio headset, display screen glasses, remote speaker system, remote speaker and microphone system, and the like. Input/output interface 338 can utilize one or more technologies, such as Universal Serial Bus (USB), Infrared, WiFi, WiMax, Bluetooth™, and the like. Haptic interface 364 is arranged to provide tactile feedback to a user of the mobile device. For example, the haptic interface 364 may be employed to vibrate mobile device 300 in a particular way when another user of a computing device is calling. Temperature interface 362 may be used to provide a temperature measurement input and/or a temperature changing output to a user of mobile device 300. Open air gesture interface 360 may sense physical gestures of a user of mobile device 300, for example, by using single or stereo video cameras, radar, a gyroscopic sensor inside a device held or worn by the user, or the like. Camera 340 may be used to track physical eye movements of a user of mobile device 300.

GPS transceiver 358 can determine the physical coordinates of mobile device 300 on the surface of the Earth, which typically outputs a location as latitude and longitude values. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of mobile device 300 on the surface of the Earth. It is understood that under different conditions, GPS transceiver 358 can determine a physical location for mobile device 300. In at least one embodiment, however, mobile device 300 may, through other components, provide other information that may be employed to determine a physical location of the device, including for example, a Media Access Control (MAC) address, IP address, and the like.

Human interface components can be peripheral devices that are physically separate from mobile device 300, allowing for remote input and/or output to mobile device 300. For example, information routed as described here through human interface components such as display 350 or keyboard 352 can instead be routed through network interface 332 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Biuetooth™, Zigbee™ and the like. One non-limiting example of a mobile device with such peripheral human interface components is a wearable computing device, which might include a remote pico projector along with one or more cameras that remotely communicate with a separately located mobile device to sense a user's gestures toward portions of an image projected by the pico projector onto a reflected surface such as a wall or the user's hand.

A mobile device may include a browser application that is configured to receive and to send web pages, web-based messages, graphics, text, multimedia, and the like. The mobile device's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of mobile device 300. The memory also stores an operating system 306 for controlling the operation of mobile device 300, it will be appreciated that this component may include a general-purpose operating system such as a version of UNIX, or LINUX™, or a specialized mobile computer communication operating system such as Windows Mobile™, or the Symbian® operating system. The operating system may include, or interface with a Java virtual machine module that enables control of hardware components and/or operating system operations via Java application programs.

Memory 304 further includes one or more data storage 310, which can be utilized by mobile device 300 to store, among other things, applications 320 and/or other data. For example, data storage 310 may also be employed to store information that describes various capabilities of mobile device 300. The information may then be provided to another device based on any of a variety of events, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions. In one embodiment, at least some of data storage 310 might also be stored on another component of mobile device 300, including, but not limited to, non-transitory processor-readable removable storage device 336, processor-readable stationary storage device 334, or even external to the mobile device. Data storage 310 may include, for example, preview data 314.

Applications 320 may include computer executable instructions which, when executed by mobile device 300, transmit, receive, and/or otherwise process instructions and data. Applications 320 may include, for example, previewing application 322. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Illustrative Network Device

Figure 4:
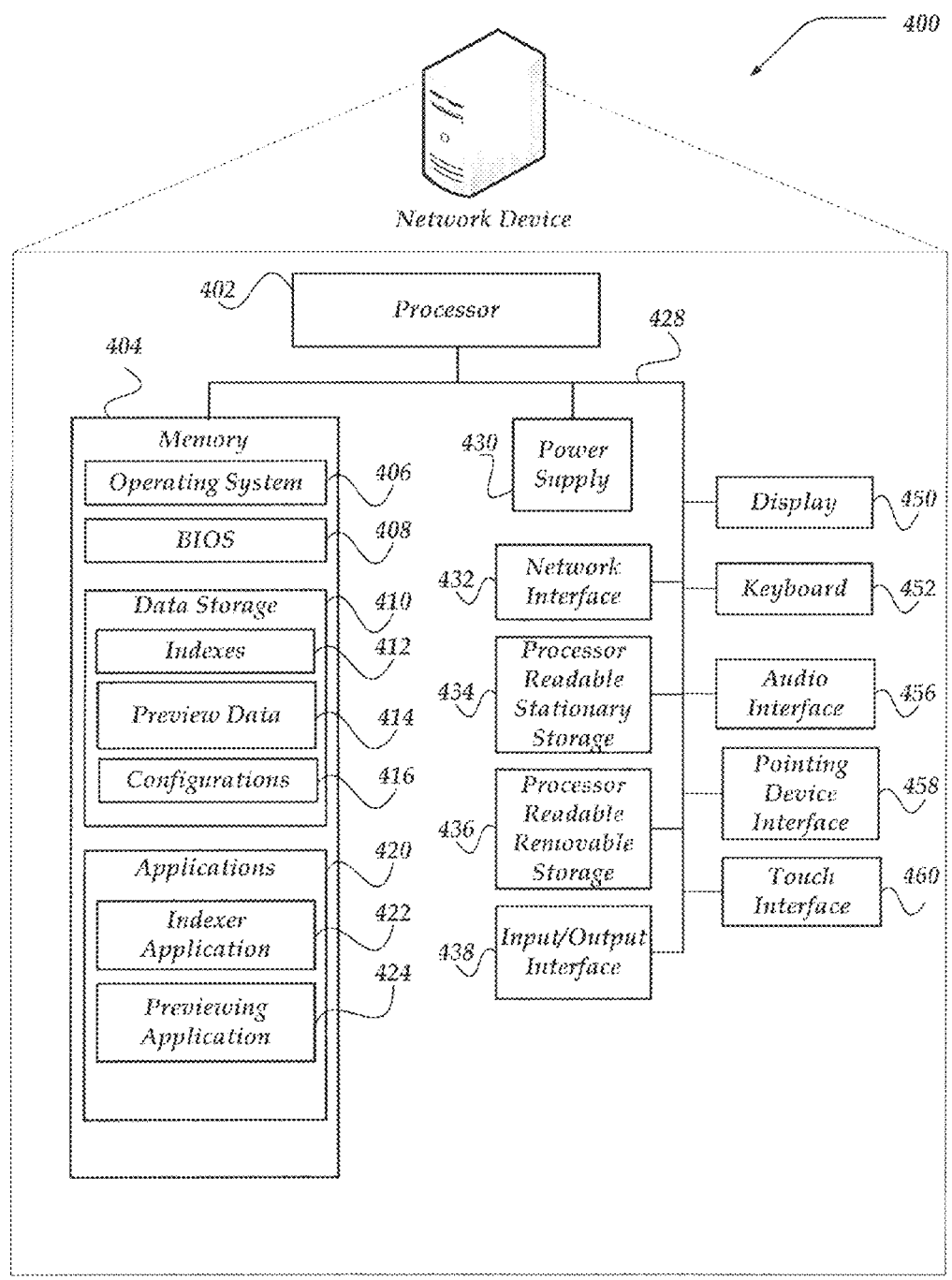
FIG. 4 illustrates a schematic embodiment of a network device.

FIG. 4 shows one embodiment of network device 400 that may be included in a system implementing the invention.

Network device 400 may include many more or less components than those shown in FIG. 4. However, the components shown are sufficient to disclose an illustrative embodiment for practicing the present invention. Network device 400 may represent, for example, one embodiment of at least one of previewing server device 112, indexing server device 114, or 120 of FIG. 1.

As shown in the figure, network device 400 includes a processor 402 in communication with a memory 404 via a bus 428. Network device 400 also includes a power supply 430, network interface 432, audio interface 456, display 450, keyboard 452, input/output interface 438, processor-readable stationary storage device 434, and processor-readable removable storage device 436. Power supply 430 provides power to network device 400.

Network interface 432 includes circuitry for coupling network device 400 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide interoperability for Microwave Access (WiMax), Session Initiation Protocol/Real-time Transport Protocol (SIP/RTP), or any of a variety of other wired and wireless communication protocols. Network interface 432 is sometimes known as a transceiver, transceiving device, or network interface card (NIC). Network device 400 may optionally communicate with a base station (not shown), or directly with another computing device.

Audio interface 456 is arranged to produce and receive audio signals such as the sound of a human voice. For example, audio interface 456 may be coupled to a speaker and microphone (not shown) to enable telecommunication with others and/or generate an audio acknowledgement for some action. A microphone in audio interface 456 can also be used for input to or control of network device 400, for example, using voice recognition.

Display 450 may be a liquid crystal display (LCD), gas plasma, electronic ink, light emitting diode (LED), Organic LED (OLED) or any other type of light reflective or light transmissive display that can be used with a computing device. Display 450 may be a handheld projector or pico projector capable of projecting an image on a wall or other object.

Network device 400 also may also comprise input/output interface 438 for communicating with external devices not shown in FIG. 4. Input/output interface 438 can utilize one or more wired or wireless communication technologies, such as USB™, Firewire™, WiFi, WiMax, Thunderbolt™, Infrared, Bluetooth™, Zigbee™, serial port, parallel port, and the like.

Human interface components can be physically separate from network device 400, allowing for remote input and/or output to network device 400. For example, information routed as described here through human interface components such as display 450 or keyboard 452 can instead be routed through the network interface 432 to appropriate human interface components located elsewhere on the network. Human interface components include any component that allows the computer to take input from, or send output to, a human user of a computer.

Memory 404 may include Random Access Memory (RAM), Read-Only Memory (ROM), and/or other types of memory. Memory 404 illustrates an example of computer-readable storage media (devices) for storage of information such as computer-readable instructions, data structures, program modules or other data. Memory 404 stores a basic input/output system (BIOS) 408 for controlling low-level operation of network device 400. The memory also stores an operating system 406 for controlling the operation of network device 400. It will be appreciated that this component may include a general-purpose operating system such as a version of UNIX, or LINUX™, or a specialized operating system such as Microsoft Corporation's Windows® operating system, or the Apple Corporation's IOs® operating system. The operating system may include, or interface with a Java virtual machine module that enables control of hardware components and/or operating system operations via Java application programs.

Memory 404 further includes one or more data storage 410, which can be utilized by network device 400 to store, among other things, applications 420 and/or other data. For example, data storage 410 may also be employed to store information that describes various capabilities of network device 400. The information may then be provided to another device based on any of a variety of events, including being sent as part of a header during a communication, sent upon request, or the like. Data storage 410 may also be employed to store social networking information including address books, buddy lists, aliases, user profile information, or the like. Data stores 410 may further include program code, data, algorithms, and the like, for use by a processor, such as processor 402 to execute and perform actions. In one embodiment, at least some of data store 410 might also be stored on another component of network device 400, including, but not limited to, non-transitory media inside processor-readable removable storage device 436, processor-readable stationary storage device 434, or any other computer-readable storage device within network device 400, or even external to network device 400. Data storage 410 may include, for example, indexes 412, preview data 414, and configurations 416.

Applications 420 may include computer executable instructions which, when executed by network device 400, transmit, receive, and/or otherwise process messages (e.g., SMS, Multimedia Messaging Service (MMS), Instant Message (IM), email, and/or other messages), audio, video, and enable telecommunication with another user of another mobile device. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 420 may include, for example, indexer application 422, and previewing application 424.

Generalized Operation

Figure 5:
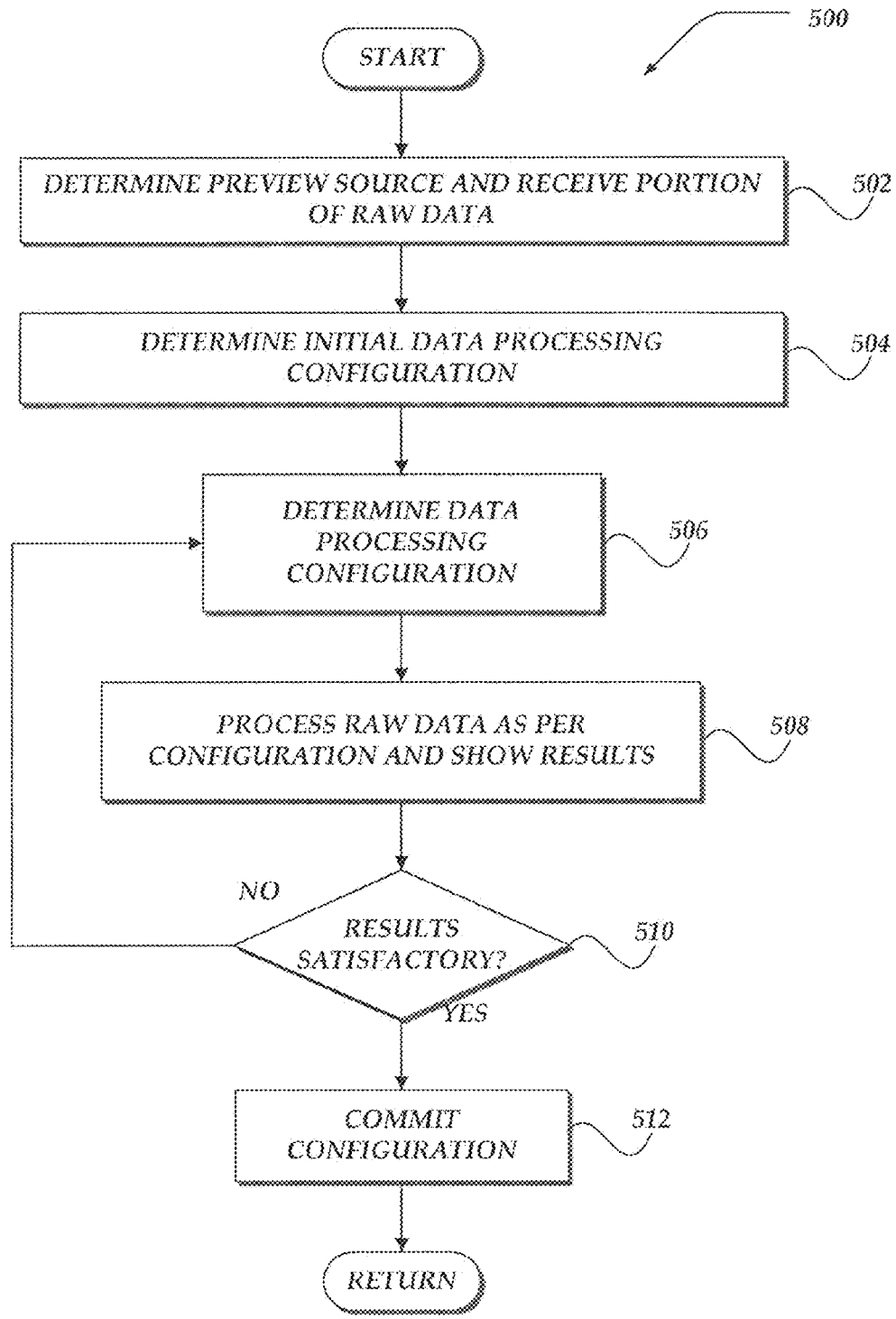
FIG. 5 shows an overview flowchart for an index previewing process in accordance with at least one of the various embodiments.
Figure 6:
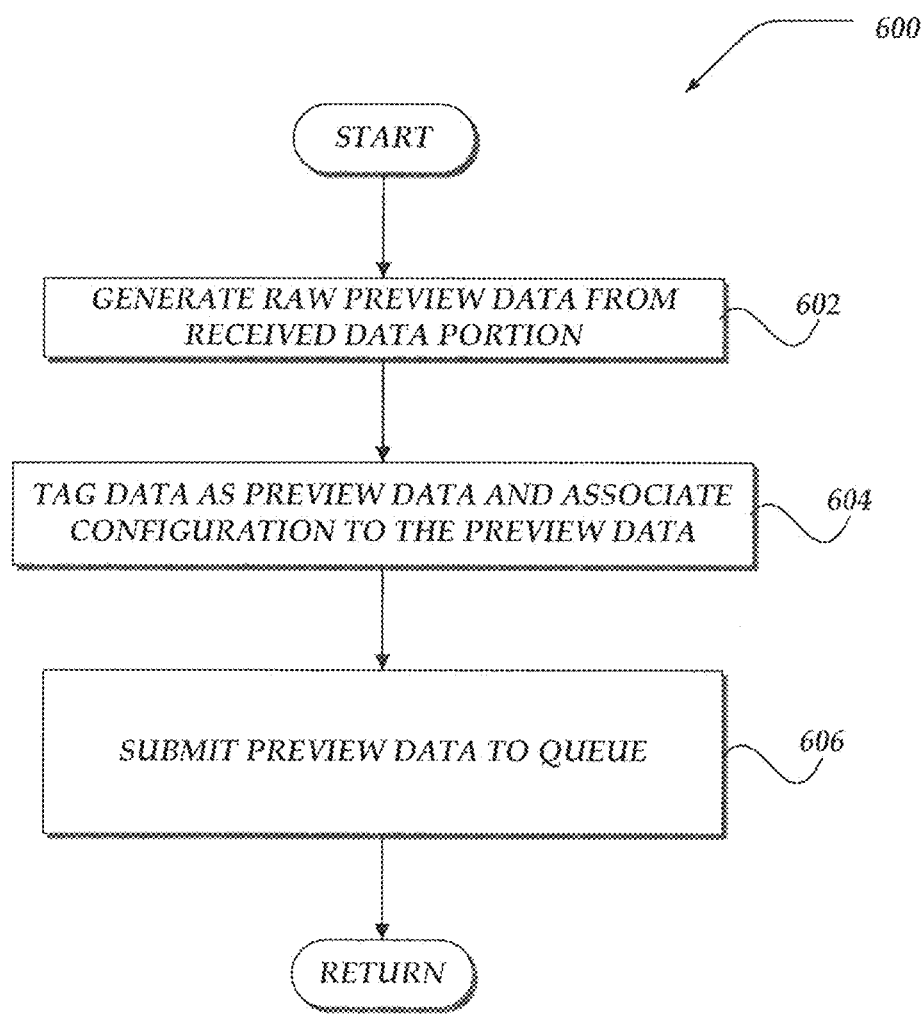
FIG. 6 shows a flowchart for a process to send preview data to a queue in accordance with at least one of the various embodiments.
Figure 7:
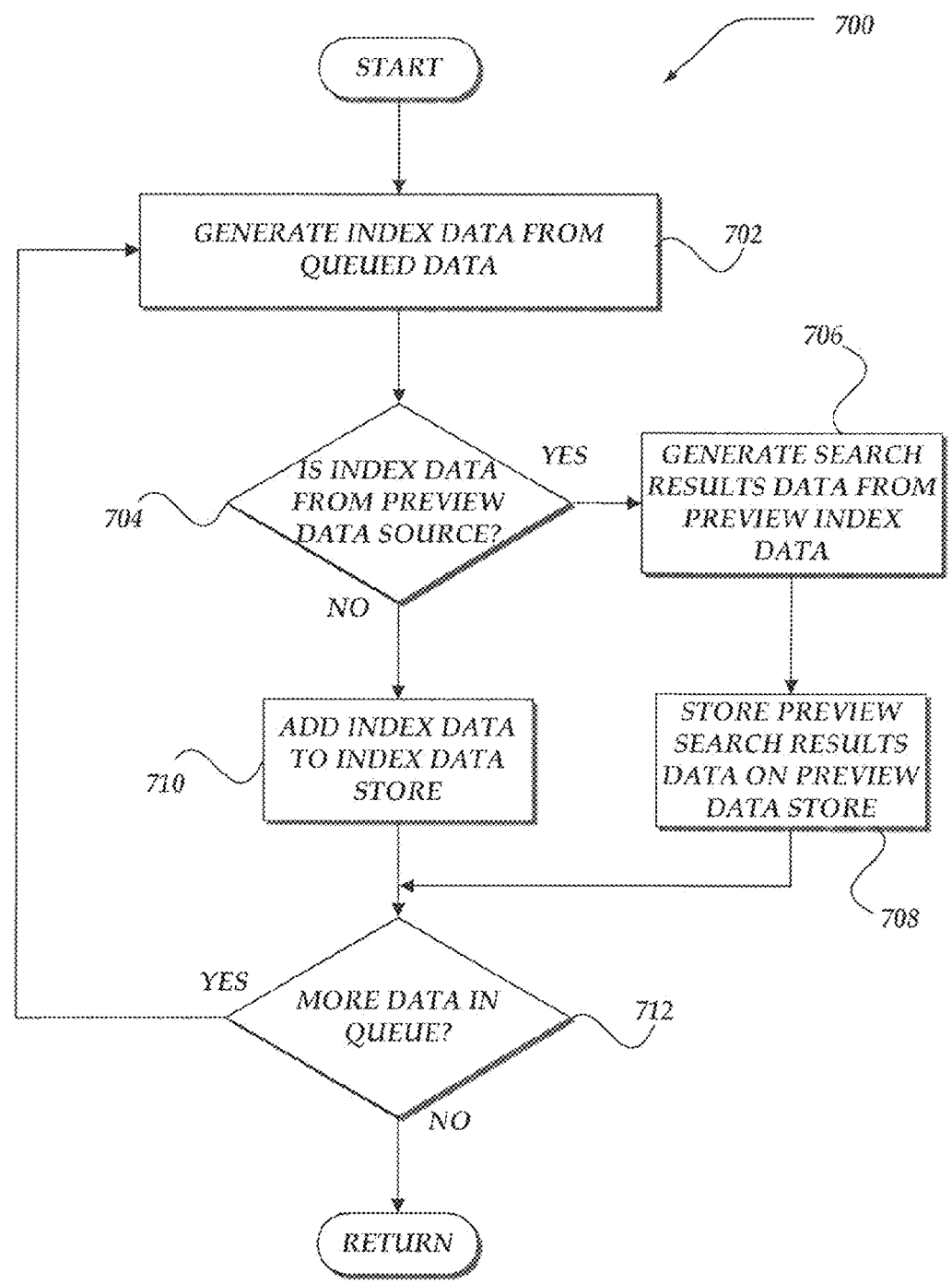
FIG. 7 shows a flowchart for a process for processing data chunks in a pipeline in accordance with at least one of the various embodiments.

FIGS. 5-7 represent the generalized operation of indexing preview in accordance with at least one of the various embodiments.

FIG. 5 shows an overview flowchart for index previewing process 500 in accordance with at least one of the various embodiments. After at start block, at block 502, in at least one of the various embodiments, determine one or more preview data sources and receive a portion of raw data from the determined preview data source. In at least one of the various embodiments, determining a preview data source may be based on type of index and/or search engine that may use the collected data.

In at least one of the various embodiments, preview data sources may be selected by browsing with a user-interface. Also, in at least one of the various embodiments, preview data sources may be selected based on one or more system configuration values and/or default values.

In at least one of the various embodiments, raw data may include unstructured data (e.g., machine data and/or log files) and/or structured data (e.g., database result sets, XML files, or the like). In at least one of the various embodiments, raw data may be received and/or processed in chunks, packets, streams, or the like.

In at least one of the various embodiments, if the preview data source includes a large data set, the previewing application may retrieve a portion of the data set sufficient to generate acceptable preview results. In at least one of the various embodiments, the amount of data collected may be determined on a default and/or pre-set maximum value (e.g., 2 mb). Also, in at least one of the various embodiments, the previewing application may scan the preview data as it is received and determine based on patterns in the data that enough data has been received to generate a preview. In at least one of the various embodiments, if additional data is required, the portion size may be increased based on user feedback. Further, in at least one of the various embodiments, the previewing application may determine that more data from the preview data source may be required based on a failure to produce sufficient preview results.

At block 504, in at least one of the various embodiments, determine the initial configuration information that may be employed to process the preview data. In at least one of the various embodiments, initial configuration information may be determined based on in part default values for the system, default values for a user, values set by a user before receiving the data, or the like. Also, in at least one of the various embodiments, a previewing application may detect patterns in the initial data portions that may be employed to determine a set of initial configuration information. For example, in at least one of the various embodiments, the previewing application may scan the data received from the preview data source and determine that it includes data patterns that may be similar to those expected for web server access logs. In this case, in at least one of the various embodiments, the previewing application may determine that the initial configuration information may include previously defined rules for processing web server access logs.

At block 506, in at least one of the various embodiments, further determine the candidate configuration information that may be employed to process the data received from the preview data source. In at least one of the various embodiments, the user and/or the system may modify the candidate configuration information. In at least one of the various embodiments, changes to the candidate configuration information may be based on the type of data being received as well as the purpose and/or type of report the system may be expected to produce.

In at least one of the various embodiments, a user may modify the candidate configuration information by adding sets of rules that may be selected from among one or more proposed rules presented in a user-interface. In at least one of the various embodiments, proposed rules may be comprised of filters, matching functions, or the like that may be arranged to respond to characteristics of the raw data. For example, in at least one of the various embodiments, an indexing application may provide one or more rules for matching web page uniform resource locators (URLs) that may be included in access log files for a web server. In at least one of the various embodiments, such rules may include one or more well-known regular expressions that may be employed to match string patterns that match the pattern of a web URL (e.g., url=htt*). In other cases, a user may modify the configuration information to prevent unwanted URLs from appearing in the indexed data by adding rules that may exclude the unwanted URLs.

At block 508, in at least one of the various embodiments, the raw data may be processed based on configuration information that may be associated with the raw data and the results may be provided to the user.

In at least one of the various embodiments, if the preview results may not be available, progress metrics related to the previewing process may be shown to a user. Also, if a portion of the preview results may be available, the portion of the results may be provided along with the previewing progress metrics.

At decision block 510, in at least one of the various embodiments, if the results generated based on the preview data processing are satisfactory, control may move to block 510. Otherwise, in at least one of the various embodiments, control may loop back to block 504 for to receive further modification to the configuration information.

In at least one of the various embodiments, preview results may be used to determine if the correct timestamp is being associated with the events included in the raw data. Also, in at least one of the various embodiments, by examining the preview results a user may determine if the delineation between events included in the raw data is correct.

At block 512, in at least one of the various embodiments, the candidate configuration information may be approved and committed to stable storage. In at least one of the various embodiments, committed configuration information may be associated with one or more data sources and employed by an indexer application to process raw data into index data that may be stored in production index stores and made available for responding to search requests.

In at least one of the various embodiments, configuration information may be stored in a file system and/or a database and made available to other users that may be processing data similar to the data that is in the preview data store. Next, in at least one of the various embodiments, control may be returned to a calling process.

FIG. 6 shows a flowchart for process 600 to provide preview data to a queue in accordance with at least one of the various embodiments. After a start block, at block 602, in at least one of the various embodiments, preview data chunks may be generated from the data received from the preview data source.

At block 604, in at least one of the various embodiments, the raw data may be tagged and/or marked to indicate that it may be intended for use as preview data. Also, in at least one of the various embodiments, the current candidate configuration information may be associated with the preview data.

In at least one of the various embodiments, raw data may be arranged and/or processed in chunks, packets, streams, or the like. In at least one of the various embodiments, tag and/or mark each raw data chunk that may include preview data as preview data chunks.

At block 606, in at least one of the various embodiments, submit the preview data to one or more queues so worker agents may retrieve the preview data from the queues and transfer it to a pipeline for further processing based on the associated candidate configuration information. Next, in at least one of the various embodiments, control may be returned to a calling process.

FIG. 7 shows a flowchart for process 700 for processing data in a pipeline in accordance with at least one of the various embodiments. After a start block, at block 702, in at least one of the various embodiments, generate index data from raw data that may be in the pipeline and/or generate preview index data from the preview data.

In at least one of the various embodiments, preview index data may be generated by an indexer application that processes preview data from preview data sources. Also, index data may be generated by an indexer application that processes raw data from non-preview data sources. In at least one of the various embodiments, an indexer application may take raw data and apply the configuration information to generate index data corresponding to the source of the raw data and/or the type of results expected/desired to be included in the index.

Also, in at least one of the various embodiments, index data chunks may be generated by an indexer application that processes raw data chunks from preview data sources and/or production (non-preview) data sources. In at least one of the various embodiments, an indexer application may take raw data chunks and apply one or more sets of configuration information to generate index data chunks corresponding to the raw data chunk and/or the type of results expected/desired to be included in the index.

For example, in at least one of the various embodiments, if raw data includes information from web server access logs, an indexer application may be configured to extract properties and features known to be included in web server log file records, such as, http methods, URLs, HTTP headers (e.g., user-agent, cookie, referrer, or the like), response codes, or the like.

At decision block 704, in at least one of the various embodiments, if the generated index data may be from preview data (e.g., originating from a preview data source), control may move to block 706. Otherwise, in at least one of the various embodiments, control may move to block 710.

In at least one of the various embodiments, a previewing application may determine if an preview index data chunk is associated with preview data chunks by determining if there is an indicative tag and/or marker in the preview index data chunk.

At block 706, in at least one of the various embodiments, generate preview result data from the preview index data. In at least one of the various embodiments, preview result data may be generated by executing one or more search commands and/or query commands against the data included in the preview data chunk and the preview index data.

At block 708, in at least one of the various embodiments, the generated preview search results data may be stored into a preview data store. In at least one of the various embodiments, a preview data store may be separate from the index stores.

In at least one of the various embodiments, storing the preview results data in the preview data store may preserve the preview results enabling users to retrieve and view the results. In at least one of the various embodiments, the previewing application may enable the stored previews results to be viewed using client applications, including previewing application 322, that may be operative on client devices, such as mobile device 300. In at least one of the various embodiments, preview results data may be viewed in graphical user-interfaces that enable users to view the effectiveness of the candidate configuration information that may have been employed to generate the preview results.

In at least one of the various embodiments, the progress of the previewing process may be tracked enabling relevant metrics related to the on going previewing process to be generated and displayed to a user. In at least one of the various embodiments, progress may be tracked by monitoring the number of preview index data chunks that may be generated by the indexer application. In at least one of the various embodiments, a metric based on the ratio of the number of preview index data chunks that have been written to the preview store to the number of preview index data chucks needed for presenting results may be calculated and displayed. In at least one of the various embodiments, the number of preview index data chunks needed for presenting preview results may vary. The number of preview index data chunks required may depend on the type of preview data being processed and/or the type of preview results being generated. In at least one of the various embodiments, the particular configuration values for generating progress metrics (e.g., ratio denominators) may be supplied by a user and/or retrieved from the configuration information.

At block 710, in at least one of the various embodiments, the processed index data may be added to one or more index data stores. In at least one of the various embodiments, production/non-preview index data produced by the indexer application may be routed to one or more production index stores to support search requests from users.

At decision block 712, in at least one of the various embodiments, if there may be more data in the pipeline, control may loop back to block 702. Otherwise, in at least one of the various embodiments, control may be returned to a calling process.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitive storage media, or the like.

Illustrative Indexing Preview Architecture

FIG. 8 illustrates for at least one of the various embodiments a logical overview of system 800 for previewing indexing. In at least one of the various embodiments, a search engine indexing system may be receiving data from one or more data sources, such as data sources 802-804, using one or more various input methods. In at least one of the various embodiments, data sources may include files, data streams, databases, or the like. Likewise, in at least one of the various embodiments, input methods may include reading files from disk, reading files from networked file systems, network connections to data streams, or the like.

In at least one of the various embodiments, data sources 802-804 may provide raw data that may be grouped/collected into data chunks that may be provided to one or more queues, such as queue 808. In at least one of the various embodiments, indexer application 422 may provide chunks of data from the data sources to queue 808.

In at least one of the various embodiments, processors, such as worker agents may transfer the received data chunks to the pipeline for processing.

In at least one of the various embodiments, appropriate worker agents (not shown) included in indexer application 422 may process the received data as it moves through pipeline 810. In at least one of the various embodiments, raw data may be received and/or processed in chunks, packets, streams, or the like. One of ordinary skill in the art will appreciate that the subject matter claimed herein applies whether the raw data, index data, preview data, or like, is received and/or arranged in chunks, packets, streams, or the like.

In at least one of the various embodiments, the worker agents may parse and process the received data chunks, such as data chunk 812, transforming the raw data into a form that is suitable for indexing (e.g., index data). In at least one of the various embodiments, if the data chunks may be processed and transformed into index data chunks without error, the index data chunks may be added to the appropriate index store, such as index store 822-824.

In at least one of the various embodiments, index stores 822-824 may include data organized to support search engine searches and/or queries. In at least one of the various embodiments, indexer application 422 may incrementally update the index stores as new index data is received from pipeline 810.

In at least one of the various embodiments, the worker agents may employ configuration information that provides rules and/or filters for influencing how the worker agents parse and organize the raw data chunks for indexing.

In at least one of the various embodiments, configuration information employed by the worker agents may be configured by users that have sufficient knowledge about the format of the raw data expected to be received from the data sources. In at least one of the various embodiments, one or more different types of data may be received from the same data source. Thus, in at least one of the various embodiments, configuration information associated with a data source may include rules and filters appropriate for more than one type of data.

In at least one of the various embodiments, if pipeline 810 encounters data chunks that cause one or more errors to be generated during processing, each error may be logged and one or more users may be notified. Also, in at least one of the various embodiments, the raw data chunks and index data chunks associated with each error may be excluded from the one or more index stores until the error may be resolved.

However, in at least one of the various embodiments, data chunks that may be parsed incorrectly producing search results that are unexpected and/or undesired may not always generate a system error. In at least one of the various embodiments, worker agents may successfully process data chunks based on incorrect configuration information. For example, the configuration information may include filters that exclude data a user expects to be indexed. Or, in at least one of the various embodiments, improperly arranged configuration information may lack sufficient rules to extract and/or organize the raw data chunks as expected/desired by the user.

In at least one of the various embodiments, raw data chunks that may be improperly parsed because of improper configuration information may proceed through pipeline 810 and be added to an index store. In at least one of the various embodiments, the improperly processed index data may pollute an index, degrading the effectiveness and usefulness of the entire index store.

In at least one of the various embodiments, previewing application 424 may be employed to preview the effect of the configuration information on raw data chunks from a data source. In at least one of the various embodiments, the raw data chunks may be converted into preview index data chunks and previewed before being added to one or more index stores. This may enable, in at least one of the various embodiments, the effect of the rules and/or filters in the configuration information may be tested and observed without polluting the index stores.

In at least one of the various embodiments, previewing application 424 may be employed to determine a preview data source, such as preview source 806. In at least one of the various embodiments, a preview source may be a source of raw data that may be provided by various sources similar to data sources. Also, in at least one of the various embodiments, preview source 806 may provide data using various input methods similar to data sources 802-804. In at least one of the various embodiments, previewing application 424 may generate or determine candidate configuration data for the raw data received from preview source 806. In at least one of the various embodiments, previewing application 424 may attach/associate the configuration data to the raw preview data chunk before submitting the data chunk to queue 808.

In at least one of the various embodiments, previewing application 424 may retrieve a portion of the data available in preview source 806 for preview processing rather than retrieving all of the data available at the preview source. The portion size used for preview processing may be determined by a configuration role that may be read from a user-interface, configuration file, database, or the like. For example, in at least one of the various embodiments, if a preview source includes a two gigabyte log file, the previewing application may be configured to read two megabytes of the file for preview processing.

In at least one of the various embodiments, preview application 424 may read data from the preview source until the received data may be detected to match the signature and/or pattern of known data types corresponding to other configuration information.

In at least one of the various embodiments, preview application 424 may enable a user to determine the parsing and field extraction rules from a set of available rules. Also, in at least one of the various embodiments, a user may create new and/or custom rules that build upon existing rules. In at least one of the various embodiments, a user may also generate new rules as well.

In at least one of the various embodiments, configuration information may be generated using a user-interface that provides access to one or more available rules. In some cases, rules that may be determined to closely match the data found in the preview data may be highlighted and/or presented in such a way to hint to the user that they may be relevant to previewing the data received from the preview source.

In at least one of the various embodiments, previewing application 424 may generate one or more preview data chunks from preview data source 806. Further, in at least one of the various embodiments, previewing application 424 may associate the candidate configuration information with the preview data chunk. Also, in at least one of the various embodiments, the preview data chunk may be further tagged and/or marked by storing a value in the data chunk that identifies it as a preview data chunk.

In at least one of the various embodiments, if the candidate configuration information is associated with the one or more preview data chunks and they have been marked as preview data chunks, the previewing application may send the one or more data chunks to queue 808.

In at least one of the various embodiments, preview data chunks may be processed in the pipeline similarly as non-preview data chunks. In at least one of the various embodiments, one or more worker agents may employ the configuration information associated with the preview data chunk that is being processed. Worker agents may employ the candidate configuration information to provide rules and information directing the worker agents how to parse and organize the received preview data chunks. In at least one of the various embodiments, the worker agents may employ the configuration information to control how the preview data chunks are parsed and organized for indexing.

In at least one of the various embodiments, data chunk 814 may include a header 816 and 818 data section. In at least one of the various embodiments, if data chunk 814 may be preview data chunk, header 816 may include a tag, key, or value that indicates that the data chunk is a preview data chunk. Also, in at least one of the various embodiments, header 816 may include a reference and/or pointer to the candidate configuration information that may be associated with the preview data chunk.

In at least one of the various embodiments, candidate configuration information may be included in header 816 or it may be included in another portion of the preview data chunk with an offset and/or reference pointing to the configuration information stored in the header.

In at least one of the various embodiments, data section 818 may include the raw data from the data source and/or it may contain the data as it is processed into index data by the various worker agents that work on the data chunk as it progresses through pipeline 810.

In at least one of the various embodiments, as worker agents complete processing of the raw data chunks and preview data chunks into index data and preview index data, respectively, the data chunks may reach the end of the pipeline. In at least one of the various embodiments, the data chunks that exit the pipeline may be index data chunks and/or preview index data chunks that have been processed and formatted by various worker agents in accordance with the configuration information corresponding to each data chunk.

In at least one of the various embodiments, as the index data chunks reach the end of the pipeline, routing agent 820 may route the index data chunks to their respective index stores. For example, raw data chunks from data source 802 may be processed through pipeline 810 and routed to index store 822. The determination of which data sources route to particular index stores may be a system configuration value set by a user or determined by the indexer application.

In at least one of the various embodiments, if routing agent 820 detects that a data chunk may be a preview index data chunk, the preview index data chunk may receive further processing. In at least one of the various embodiments, indexer application may execute a search string against the preview index data chunk to generate preview search results based on the preview index data chunks.

In at least one of the various embodiments, executing the search string may generate a collection of preview search result data that may formatted the same as non-preview search results produced from non-preview index stores. In at least one of the various embodiments, the preview search results based on the preview index data chunks may be routed to preview store 826 for storage.

In at least one of the various embodiments, preview result store 826 may be accessed by users and/or client devices for viewing the preview search results in preview report views using graphical user-interfaces, web pages, consoles, or the like. In at least one of the various embodiments, if the user is unsatisfied with the results of the preview report views, the user may modify the candidate configuration information and resubmit the preview data for processing through pipeline 810.

In at least one of the various embodiments, a user may iteratively modify the candidate configuration information and view the resulting preview reports until the user may be satisfied that the configuration information may produce satisfactory results if it is applied to data of the type in the preview data source.

In at least one of the various embodiments, if the user is satisfied with the configuration information, it may be committed to the indexing system for non-preview use. Also, in at least one of the various embodiments, data of the type held in the preview source may now be processed by the pipeline and routed to production index stores rather than being routed to a preview store.

In at least one of the various embodiments, the preview data source may include example data that corresponds to another live data source, or the preview data source may be a source of production data that may be indexed if the candidate configuration information is committed to the system.

In at least one of the various embodiments, configuration information may be associated with one or more data sources. In at least one of the various embodiments, if candidate configuration information may be committed, it may be available for associating with various data sources in the system.

It will be understood that for at least one of the various embodiments, various types of data may be received and processed as described and claimed herein. And, at least one of the various embodiments is not limited to processing machine data.

What is claimed as new and desired to be protected by Letters Patent of the United States is:

1. A method, comprising:
   receiving raw data that has not been indexed;
   determining initial configuration information to be used to parse the raw data into events that include portions of the raw data;
   using the configuration information to parse a portion of the raw data to generate a visual preview of one or more of the events that would be generated by parsing the raw data using the configuration information;
   determining whether the visual preview indicates that the configuration information produces an acceptable parsing of raw data into events;
   based on determining that the visual preview indicates that the configuration information does not produce an acceptable parsing of raw data into events, modifying the configuration information;
   using the configuration information to organize the raw data into the events and to store the portions of the raw data in the events;
   wherein the method is performed by one or more computing devices.

2. The method of claim 1, wherein the initial configuration information is determined based on the raw data in the events.

3. The method of claim 1, wherein the initial configuration information is determined based on a source of the raw data.

4. The method of claim 1, wherein the initial configuration information is selected by a user.

5. The method of claim 1, wherein determining whether the visual preview indicates that the configuration information produces the acceptable parsing of raw data into events comprises receiving input from a viewer of the visual preview indicating whether the viewer finds information displayed in the visual preview to be acceptable.

6. The method of claim 1, wherein the portion of the raw data parsed using the configuration information comprises preview data marked to at least indicate that the preview data is from a preview data source.

7. The method of claim 1, further comprising parsing additional raw data into events using the configuration information.

8. The method of claim 1, further comprising causing a display of the visual preview in a graphical user interface.

9. The method of claim 1, further comprising storing the events in different data stores.

10. The method of claim 1, wherein the visual preview is presented within an interface that allows the user to modify the configuration information, wherein such modification is an indication that the parsing was not satisfactory.

11. A network device that is operative for indexing data comprising:
a memory that is operative to store at least instructions; and
a processor device that is operative to execute instructions that enable actions, including:
receiving raw data that has not been indexed;
determining initial configuration information to be used to parse the raw data into events that include portions of the raw data;
using the configuration information to parse a portion of the raw data to generate a visual preview of one or more of the events that would be generated by parsing the raw data using the configuration information;
determining whether the visual preview indicates that the configuration information produces an acceptable parsing of raw data into events;
based on determining that the visual preview indicates that the configuration information does not produce an acceptable parsing of raw data into events, modifying the configuration information;
using the configuration information to organize the raw data into the events and to store the portions of the raw data in the events.

12. The network device of claim 11, wherein the initial configuration information is determined based on the raw data in the events.

13. The network device of claim 11, wherein the initial configuration information is determined based on a source of the raw data.

14. The network device of claim 11, wherein the initial configuration information is selected by a user.

15. The network device of claim 11, wherein determining whether the visual preview indicates that the configuration information produces the acceptable parsing of raw data into events comprises receiving input from a viewer of the visual preview indicating whether the viewer finds information displayed in the visual preview to be acceptable.

16. The network device of claim 11, wherein the portion of the raw data parsed using the configuration information comprises preview data marked to at least indicate that the preview data is from a preview data source.

17. The network device of claim 11, wherein the actions further comprise parsing additional raw data into events using the configuration information.

18. The network device of claim 11, wherein the actions further comprise causing a display of the visual preview in a graphical user interface.

19. The network device of claim 11, wherein the actions further comprise storing the events in different data stores.

20. The network device of claim 11, wherein the visual preview is presented within an interface that allows the user to modify the configuration information, wherein such modification is an indication that the parsing was not satisfactory.

21. A non-transitive storage medium that stores instructions for indexing data, wherein execution of the instructions by a processor device enables actions, comprising:
receiving raw data that has not been indexed;
determining initial configuration information to be used to parse the raw data into events that include portions of the raw data;
using the configuration information to parse a portion of the raw data to generate a visual preview of one or more of the events that would be generated by parsing the raw data using the configuration information;
determining whether the visual preview indicates that the configuration information produces an acceptable parsing of raw data into events;
based on determining that the visual preview indicates that the configuration information does not produce an acceptable parsing of raw data into events, modifying the configuration information;
using the configuration information to organize the raw data into the events and to store the portions of the raw data in the events.

22. The medium of claim 21, wherein the initial configuration information is determined based on the raw data in the events.

23. The medium of claim 21, wherein the initial configuration information is determined based on a source of the raw data.

24. The medium of claim 21, wherein the initial configuration information is selected by a user.

25. The medium of claim 21, wherein determining whether the visual preview indicates that the configuration information produces the acceptable parsing of raw data into events comprises receiving input from a viewer of the visual preview indicating whether the viewer finds information displayed in the visual preview to be acceptable.

26. The medium of claim 21, wherein the portion of the raw data parsed using the configuration information comprises preview data marked to at least indicate that the preview data is from a preview data source.

27. The medium of claim 21, wherein the actions further comprise parsing additional raw data into events using the configuration information.

28. The medium of claim 21, wherein the actions further comprise causing a display of the visual preview in a graphical user interface.

29. The medium of claim 21, wherein the actions further comprise storing the events in different data stores.

30. The medium of claim 21, wherein the visual preview is presented within an interface that allows the user to modify the configuration information, wherein such modification is an indication that the parsing was not satisfactory.

* * * * *